(12) United States Patent
Bv et al.

(10) Patent No.: US 11,954,431 B2
(45) Date of Patent: Apr. 9, 2024

(54) INTELLIGENT CHANGE SUMMARIZATION FOR DESIGNERS

(71) Applicant: Adobe Inc., San Jose, CA (US)

(72) Inventors: Suryateja Bv, Hyderabad (IN); Vishwa Vinay, Bangalore (IN); Niyati Himanshu Chhaya, Hyderabad (IN); Navita Goyal, College Park, MD (US); Elaine Chao, Castro Valley, CA (US); Balaji Vasan Srinivasan, Bangalore (IN); Aparna Garimella, Hyderabad (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/522,790

(22) Filed: Nov. 9, 2021

(65) Prior Publication Data

US 2023/0141448 A1     May 11, 2023

(51) Int. Cl.
| | |
|---|---|
| *G06F 40/194* | (2020.01) |
| *G06F 16/901* | (2019.01) |
| *G06F 16/93* | (2019.01) |
| *G06F 40/14* | (2020.01) |

(52) U.S. Cl.
CPC ........ *G06F 40/194* (2020.01); *G06F 16/9027* (2019.01); *G06F 16/93* (2019.01); *G06F 40/14* (2020.01)

(58) Field of Classification Search
CPC .... G06F 40/14; G06F 40/194; G06F 16/9027; G06F 16/93
USPC ........................................................ 715/229
See application file for complete search history.

(56) References Cited

U.S. PATENT DOCUMENTS

| | | | | |
|---|---|---|---|---|
| 6,449,624 B1* | 9/2002 | Hammack | .......... | G05B 19/0426 |
| | | | | 707/999.203 |
| 9,477,703 B1* | 10/2016 | Criss | .......... | G06Q 10/06 |
| 10,600,228 B1* | 3/2020 | Sasikumar | ............. | G06T 13/80 |
| 11,295,076 B1* | 4/2022 | Kumar | ................. | G06F 40/289 |
| 2008/0177782 A1* | 7/2008 | Poston | ................. | G06F 40/197 |
| | | | | 707/999.102 |
| 2018/0285326 A1* | 10/2018 | Goyal | ................. | G06F 16/288 |

OTHER PUBLICATIONS

J. Torres, et al., "Measuring contribution in collaborative writing: An adaptive NMF topic modelling approach," 2017 Fourth International Conference on eDemocracy & eGovernment (ICEDEG), 2017, pp. 63-70 (Year: 2017).*

(Continued)

*Primary Examiner* — Stephen S Hong
*Assistant Examiner* — Nicholas Hasty
(74) *Attorney, Agent, or Firm* — Nicholson De Vos Webster & Elliott LLP

(57) ABSTRACT

Embodiments are disclosed for generating an intelligent change summary are described. In some embodiments, a method of generating an intelligent change summary includes obtaining a representation of a plurality of versions of a document, determining a distance score based on a comparison of a first of version of the document and a second version of the document, the distance score representing a magnitude of changes made from the first version of the document to the second version of the document, and generating a change summary of the document based on the distance score.

19 Claims, 14 Drawing Sheets

(56) References Cited

OTHER PUBLICATIONS

T. Bleifuß, et al., "Structured Object Matching across Web Page Revisions," 2021 IEEE 37th International Conference on Data Engineering (ICDE), 2021, pp. 1284-1295 (Year: 2021).*

Mozer, Reagan et al. "Matching with Text Data: an Experimental Evaluation of Methods for Matching Documents and of Measuring Match Quality" Mar. 2019, Arxiv, https://arxiv.org/abs/1801.00644 (Year: 2019).*

Chen, H.-T. et al., "Data-Driven Adaptive History for Image Editing," Proceedings of the 20th ACM SIGGRAPH Symposium on Interactive 3D Graphics and Games (I3D '16), Association for Computing Machinery, Feb. 2016, pp. 103-111.

Da, J. et al., "Edited Media Understanding: Reasoning About Implications of Manipulated Images," arXiv:2012.04726v1 [cs.CL], Dec. 8, 2020, pp. 1-13.

Fu, T.-J. et al., "SSCR: Iterative Language-Based Image Editing via Self-Supervised Counterfactual Reasoning," Proceedings of the 2020 Conference on Empirical Methods in Natural Language Processing, Nov. 2020, pp. 4413-4422.

Gupta, B.P.R. et al., "NwQM: A Neural Quality Assessment Framework for Wikipedia," Proceedings of the 2020 Conference on Empirical Methods in Natural Language Processing (EMNLP), Nov. 2020, pp. 8396-8406.

He, J. et al., "Learning Sparse Prototypes for Text Generation," arXiv:2006.16336v2 [cs.CL], Nov. 4, 2020, pp. 1-15.

Jhamtani H. et al., "Learning to Describe Differences Between Pairs of Similar Images," arXiv:1808.10584 [cs.CL], Aug. 2018, pp. 1-11.

Kim, J.-H. et al., "CoDraw: Collaborative Drawing as a Testbed for Grounded Goal-driven Communication," Proceedings of the 57th Annual Meeting of the Association for Computational Linguistics, Aug. 2019, pp. 6495-6513.

Liu, X. et al., "Open-Edit: Open-Domain Image Manipulation with Open-Vocabulary Instructions," arXiv:2008.01576v2 [cs.CV], Apr. 21, 2021, pp. 1-18.

Mallinson, J. et al., "Felix: Flexible Text Editing Through Tagging and Insertion," Findings of the Association for Computational Linguistics: EMNLP 2020, Nov. 2020, pp. 1244-1255.

Marrese-Taylor, E. et al., "An Edit-Centric Approach for Wikipedia Article Quality Assessment," Proceedings of the 2019 EMNLP Workshop W-NUT: The 5th Workshop on Noisy User-generated Text, Nov. 2019, pp. 38'1-386.

Python Software, Difflib, retrieved from Internet: https://docs.python.org/3/library/difflib.html, retrieved on Sep. 12, 2022, pp. 1-12.

Wang, S.Y. et al. "Detecting Photoshopped Faces by Scripting Photoshop," 2019 IEEE/CVF International Conference on Computer Vision (ICCV), Jun. 2019, pp. 10072-10081.

Xu, W. et al., "Editor: An Edit-Based Transformer with Repositioning for Neural Machine Translation with Soft Lexical Constraints," Transactions of the Association for Computational Linguistics, vol. 9, Mar. 2021, pp. 311-328.

Yin P. et al., "Learning to Represent Edits," arXiv:1810.13337v2 [cs.LG], Feb. 22, 2019, pp. 1-22.

* cited by examiner

INTELLIGENT CHANGE SUMMARIZATION FOR DESIGNERS

BACKGROUND

Coediting is a key aim of collaboration, that allows multiple creators to design simultaneously on the same canvas/artboard. Increasingly, design workflows are moving to digital platforms which enable geographic distribution of collaborators. As a result, scenarios wherein designers with varying levels of expertise work together on a common canvas are on the rise. This may take the form of cloud-based documents which may be maintained remotely and accessed by multiple users. Cloud documents enable collaboration—in some cases, real-time coediting. Cloud documents are frequently auto-saved, and these prior saves may be made available to a user via document history or version history. This enables users to browse, access, and restore prior states of the document on which they are collaborating. However, management of changes, particularly over long-lived documents, is complex and it can be difficult to identify the version where specific changes were made to the document without already knowing when those changes were made.

These and other problems exist with regard to collaborative design in electronic systems.

SUMMARY

Introduced here are techniques/technologies that provide an automated approach to surface changes in a cloud document over time. This enables a different manner of browsing changes and identifying points that may represent inflection points in the lifetime of the document. In some embodiments, a design management system compares versions of a document to clearly demarcate changes that the user might find interesting when solving the problem of choosing which version of the document to open or mark as a milestone. These identified inflection points can then be leveraged by users for increased ease in navigation as well as to mark bookmarked versions for archival and future use.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Tracking changes, versioning, and saving checkpoints are common features of many software applications. For example, GitHub tracks changes made to code via commits, and provides tools to visually compare what lines have been added and deleted. Visual Studio Code follows a similar routine to depict differences between two instances of code. Various applications provide users with timestamped versions along with changes highlighted. Online design applications also provide version control, but these design applications primarily enable synchronous workflows with no conflicts across versions. Such conventional applications do not attempt to structure and/or semantically understand changes made by multiple users on their canvas beyond timestamp indexing. Other applications can identify conflicting edits but otherwise rely on user annotations to identify which changes are important.

As discussed, prior systems do not tackle the problem of understanding changes in the complex digital design space, wherein the scope of changes can range from minute (changing the border thickness of a rectangle) to significant (changing the emotional theme of the canvas). No attempt is made at deriving the intent and/or ranking (e.g., by quality, significance, etc.) the changes. Text-editing models and image-editing models apply simple changes with a restricted scope across small time periods. Embodiments gather and summarize changes across much larger time periods, such as all or some of the lifecycle of a design document.

Embodiments automatically identify important edits/change points in collaborative documents/designs. These changes are scored to identify the inflection points from various edits and changes available in a document. The scoring can also be used to differentiate between a regular (e.g., minor) change and an inflection point (e.g., major change) in a document or a design. This enables quick navigation to critical points, and automated identification of important document versions.

Although prior techniques track changes generally, these tools require users to manually go through hundreds of versions of a given document to navigate through the progression of changes that have occurred along the way to identify the versions that introduce important changes. Further, as changes and edits typically occur across several dimensions, it is non-trivial to identify the semantic significance of the change in context of the rest of the design. Embodiments allow for important changes to a document to be identified, labeled according to the type of changes made, and sorted according to score, change type, etc. This makes it easier for users to track and report updates and revert to a specific change, if needed.

Figure 1:
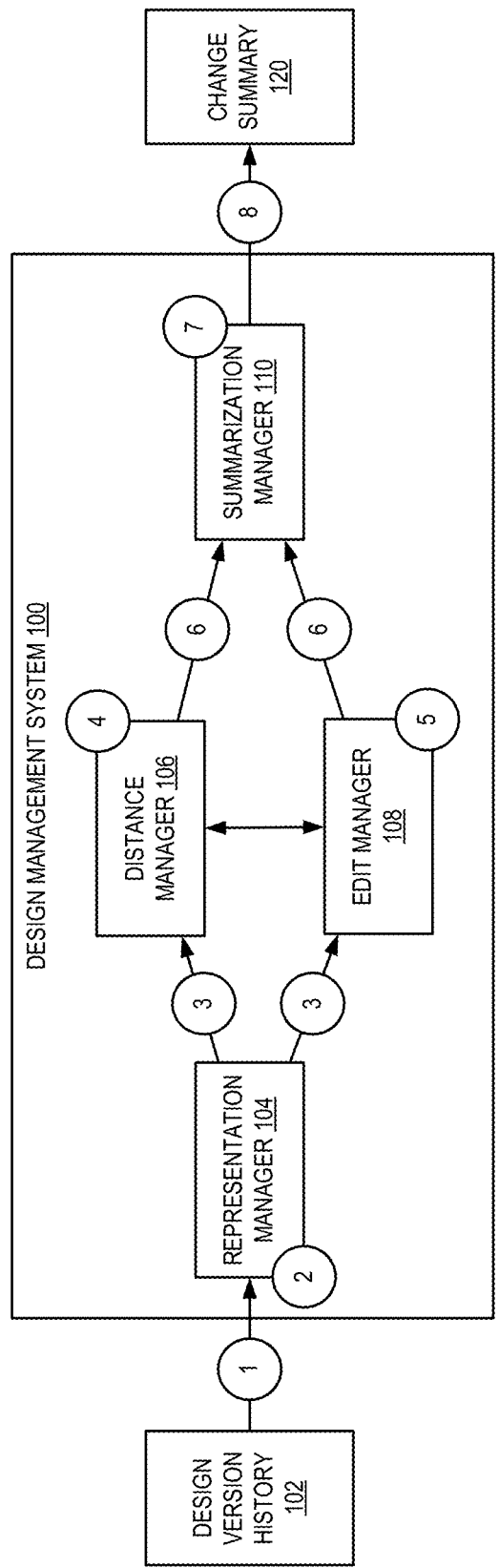
FIG. 1 illustrates a diagram of a process of intelligent change summarization in accordance with one or more embodiments.

FIG. 1 illustrates a diagram of a process of intelligent change summarization in accordance with one or more embodiments. As shown in FIG. 1, embodiments may include a design management system 100. In some embodiments, design management system 100 may be incorporated into a design application, suite of applications, etc. or may be implemented as a standalone system which interfaces with a design application, suite of applications, etc. to provide version tracking and management services to the application(s) with which it interfaces. Design management system 100 is responsible for ranking and categorizing versions of documents based on the changes that occur across them.

For example, at numeral 1, the design management system 100 may receive a design version history 102. The design version history 102 may include a plurality of timestamped versions of a particular document. In some embodiments, the design version history may be a data structure which points, or is otherwise linked, to the plurality of timestamped versions of the document which may be stored in a central storage location or across a plurality of electronic devices (e.g., desktops, laptops, servers, mobile devices, etc.). In some embodiments, each version of a document may be a separate file saved by the user or users or saved automatically by the application in which the document is being edited. In some embodiments, the design version history 102 may be specific to the type of document and/or application and may be made available to the design management system 100 by the application.

When the design version history 102 is received by the design management system 100, it can be processed by representation manager 104. In some embodiments, representation manager 104 can generate a representation of the document based on its version history 102, at numeral 2. For example, as discussed further below, a design version history may be converted into a JSON, XML, or other format. The representation format enables the various versions of the document in the version history 102 to be compared to identify changes from one version to the next. By comparing a representation of a version of the document to a representation of a previous version of the document, a progression of how the document changed (e.g., what got added when, at what point did something change, was something removed, etc.), can be determined by the design management system 100. Once these changes are identified, embodiments score these changes and identify the delta or the differences across consecutive changes to mark the inflection points in the document using an unsupervised scoring and distance calculation technique, described further below.

As discussed, co-editing a document yields multiple versions that are saved automatically after a series of changes. At numeral 3, distance manager 106 receives the representation of the design version history 102 from representation manager 104. In some embodiments, the input to the design management system 100 may be a representation of the design version history 102 (e.g., such that no reformatting is required). In such instances, the representation manager 104 may be bypassed. Alternatively, the representation manager 104 may determine that the input design version history 102 is already properly formatted (e.g., based on file type or other attributes) and pass through the representation to the distance manager 106.

At numeral 4, distance manager 106 determines a distance metric value that indicates how different two versions of a document are. The distance manager 106 can determine the distance metric for each consecutive pair of versions in the design version history. As discussed, the design version history 102 may include a plurality of saved versions. The saved versions may be defined as $v_i$ for i=1, ..., T. Each of these versions may comprise a sequence of changes from the previous version. To determine inflection points in multiple versions, a distance function $d(v_i, v_{i+1})$ is defined between the $i^{th}$ and $i+1^{st}$ version.

Embodiments are described with respect to user interface design documents, such as are generated with a user interface design application such as Adobe XD. This is for simplicity of explanation, and not intended to be limiting. Embodiments are similarly applicable to other design document types associated with different design applications. As described above, a document version may include multiple artboards, such as $b_1$, $b_2$, $b_n$. In some embodiments, $b_{ij}$ represents the data corresponding to $j^{th}$ artboard in the $i^{th}$ version comprising attributes defining the state of various elements on the canvas at that time-step. The elements may include shapes (rectangle, ellipse, line, etc.), text, or groups such as components, etc. This method is amenable to extend to other types of elements as new object definitions are added to the design/creation platform. The various attributes may include the size, position, stroke, color, text, etc. depending upon the element type. The following notation is defined:

$e_k^{b_{ij}}$ is the $k^{th}$ elements on the artboard $b_{ij}$, for k=1, 2, ..., K.

$\alpha_p(e_k^{b_{ij}})$ the $p^{th}$ attribute of $e_k^{b_{ij}}$-th element, for p=1, 2, ..., P.

For changes in existing artboards and objects, the distance $d(v_i, v_{i+1})$ between $i^{th}$ and $i+1^{st}$ version is evaluated as, $$d^1(v_i, v_{i+1}) = \sum_{j=1}^{n}\sum_{k=1}^{K}\sum_{p}^{P}\left|a_p\left(e_k^{b_{i,j}}\right), a_p\left(e_k^{b_{i+1,j}}\right)\right| + \sum_{j'}K(j') \quad (1)$$

The first term here determines the change distance between different attributes (such as "fill", "text", "shape") across version i and version i+1. For instance, the first term results in a weighted Levenshtein distance when the "text" attribute is considered. The second term corresponds to the addition or deletion of artboards. K(j') is the number of elements on the added/deleted artboard j', where j'= $\{j \in b_i, j \notin b_{i+1}\} \cup \{j \notin b_i, j \in b_{i+1}\}$. Intuitively, here the differences are captured between the elements on the artboards as well as the differences in the attributes across these elements. This helps quantify the change in terms of well-defined steps.

To identify inflection versions, the top-k (k=5) versions with highest distance metric value (e.g., representing the versions that have changed the most from their previous versions) between the last (i) and the current (i+1) version are considered. In some embodiments, the value of K is empirically determined based on the distribution of scores associated with the document being analyzed. The inflection versions or points are further categorized into high, medium, and low significance based on the delta in the scores i.e., the distance values. These values are provided as guidance as against a very rigid metric as they tend to be subjective with respect to the designer and their needs in the context of the document.

While identification of inflections across all edits in a file can help with easy navigation, there is also a need to distinguish the types of edits occurring on a document. In some embodiments, edit manager 108 is responsible for identifying the edit type associated with changes made between versions of the document, at numeral 5. In some embodiments, the edit manager 108 can receive a list of changes between versions identified by the distance manager 106, as described above. The edit manager can then identify the "key" associated with the changed attributes in the representation of the version to determine the type of types of changes that have been made.

Being able to navigate changes by the type of edit that was made improves the ability for the reviewer to focus on the changes that are important to them. For example, a color edit may be more important to a reviewer of a design document as compared to a reviewer of a text document. On the other hand, changes in the text fields may be more significant to a reviewer of a text-heavy document where semantics are critical. Accordingly, the changes between versions are further categorized into at least the following types: additions, artboard-addition, artboard-deletion, color-change, deletion, and text-change. Equation 1, above, may be applied for inflection detection on the local subset of type specific changes as well. This enables the user to navigate through their history and changes using terms such as "take me to the color changes" or "component additions," etc. Note that these changes do not occur in isolation, and hence some formulation towards inflection identification is needed.

In some embodiments, the edit manager receives a list, or other data structure, that identifies the changes made between versions, as identified by the distance manager at numeral 4. Alternatively, the edit manager can perform its own comparison of the representations of two versions of the document obtained from representation manager 104. As discussed, the representation manager can convert versions of the document from the design version history 102 into a format for analysis. For example, the representation manager 104 may convert artboard AGC files to JSON format and use the existing keys as an indicator of the type of change. For example, all changes in values of "fill" keys are categorized into color changes. Any changes in values of "text" keys in AGC-JSON document may be categorized into text changes. Newly added artboards are categorized as "artboard-addition" changes and removed artboards are categorized as "artboard-deletion." Artboards are identified as having been added or deleted when there is no corresponding artboard in one of the versions being processed. Similarly, if an element is removed from a version of the document as compared to a previous version, then that change is categorized as a "deletion." Likewise, if an element is added as compared to a previous version of the document, then that change is categorized as an "addition."

In some embodiments, different keys may be weighed depending on importance. For example, "fill" keys may be weighed at different levels of abstraction with hierarchical importance. This allows for "fill" changes at an artboard level to get higher weight as compared to "fill" changes at a graphic object level. In some embodiments, a sequence matcher is used to align the JSON elements and categorize the changes to the corresponding types. This ensures that "fill" or "text" key-value pairs of the same artboard are compared across two versions.

Once the changes between versions have been identified, and distance scores and edit types determined, this information may be provided to summarization manager 110, at numeral 6. The summarization manager 110 can generate a visual representation of the changes which identifies changes made between versions of the document, at numeral 7. As discussed further, the resulting change summary 120 can highlight high, medium, and low significance changes, enable the user to restore prior versions of changes made to specific elements, etc. The change summary can be output to the user at numeral 8. This may include displaying the change summary as part of a graphical user interface of a design application, as a standalone design management or version management application, etc. In some embodiments, the change summary can be generated in a format that can be reviewed outside of the design application, such as a portable document format (PDF) document, etc.

Figure 2:
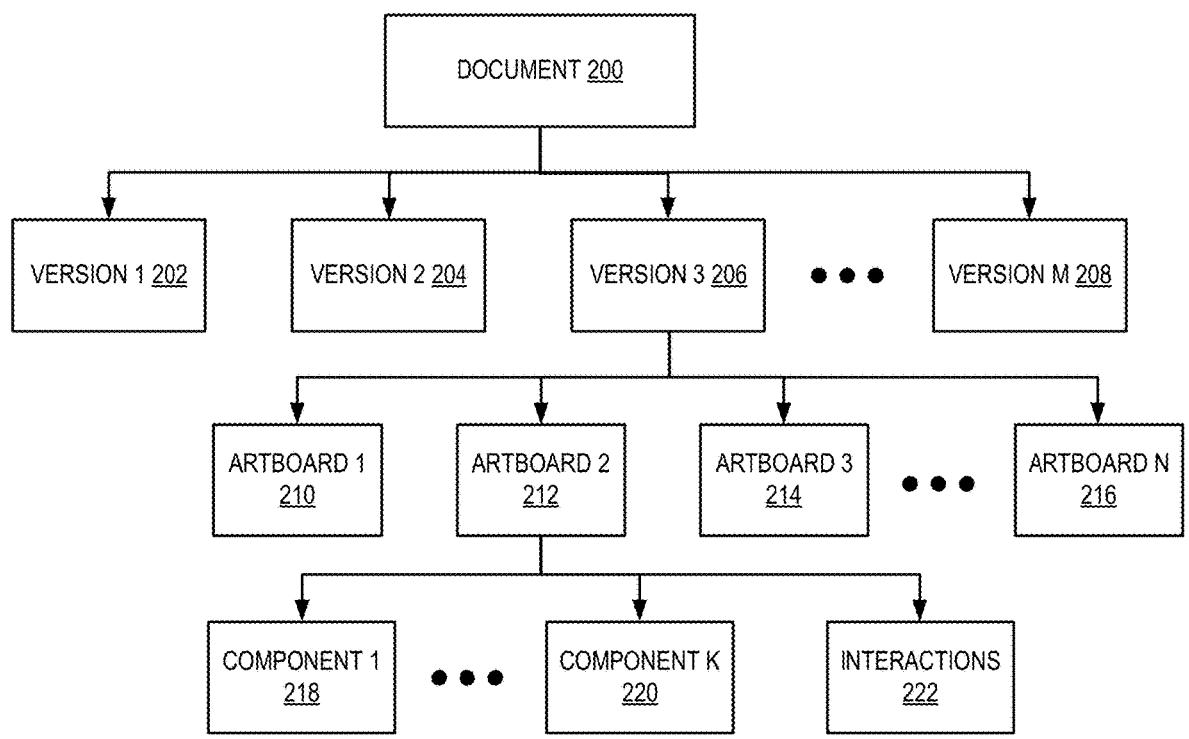
FIG. 2 illustrates a diagram of a structure of a document in accordance with one or more embodiments.

FIG. 2 illustrates a diagram of a structure of a document 200 in accordance with one or more embodiments. In some embodiments, each document may be indexed with a unique identifier, which can be used to query related document data from a storage location. Document data may include a list of versions, and each version may include a set of components and/or interactions. In the example of FIG. 2, document 200 is associated with M-1 versions: version 1 202 to version M 208. Each version is associated with one or more artboards. For example, version 3 206 includes N-1 artboards: artboard 1 210 to artboard N 216. Each artboard may further include one or more components of interactions. For example, artboard 2 212 includes K-1 components: component 1 218 to component K 220 and interaction 222. Other types of documents may be organized differently. For example, document 200 may be a user interface design document. If a text document were being represented, then each version may not include an artboard.

The design management system 100 iterates over the components using a manifest file and downloads the components and/or interactions for each of the versions. The components are converted from their existing format (such as AGC format) to a representation format (such as JSON format) for processing. Each component comes with features such as shape, size, color, relative and absolute positions in the canvas, artboard ID, name, text, etc. Components may be grouped together based on their artboard ID. This provides a textual context for the canvas to be analyzed across versions. In some embodiments, visual context may be obtained natively from the document data when renderings of artboards are stored. Alternatively, or additionally, screen captures of artboards may be obtained (manually or automatically) and used for visual context.

Figure 3:
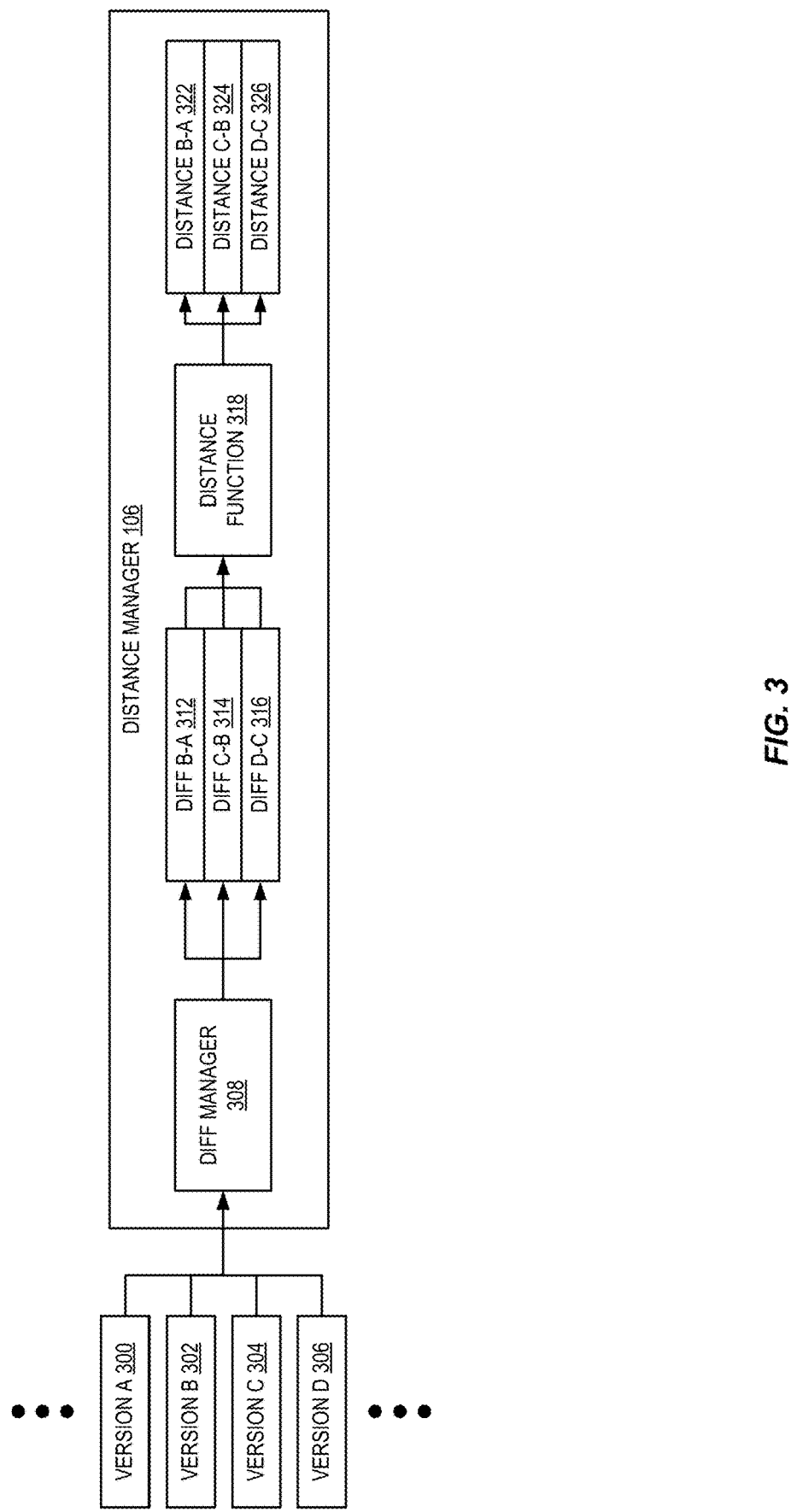
FIG. 3 illustrates a diagram of a process of computing distances between versions of a document, in accordance with one or more embodiments.

FIG. 3 illustrates a diagram of a process of computing distances between versions of a document, in accordance with one or more embodiments. As discussed, distance manager 106 is responsible for identifying changes between versions of a document, such as versions A-D 300-306. The versions 300-306 may be obtained from a version history, as discussed above. The versions may be representations of the versions of the document, which have been converted into a JSON, or other format, file to capture the elements of each version. These versions may be received by a diff manager 308 which compares corresponding elements from each consecutive pair of versions. For example, as shown in FIG. 3, diff manager 308 can calculate three diffs from four input versions. These diffs include diff B-A 312, diff C-B 314, and diff D-C 316. More or fewer diffs may be computed depending on the number of versions received by the distance manager.

Each diff 312-314 may include a list of all changes between two versions. This may include different fill values, different text values, new or removed elements, etc. These diffs may be provided to distance function 318. Distance function 318 can compute a distance that quantifies the changes between the versions. For example, equation 1, above, shows one such distance function 318 that may be used to compute the distance value. In the example of equation 1, the distance value is a combination of the change in values of attributes of elements and the total number of new or removed elements. However, alternative distance functions may also be used. For example, weights may be applied to the values of some types of elements.

Figure 4:
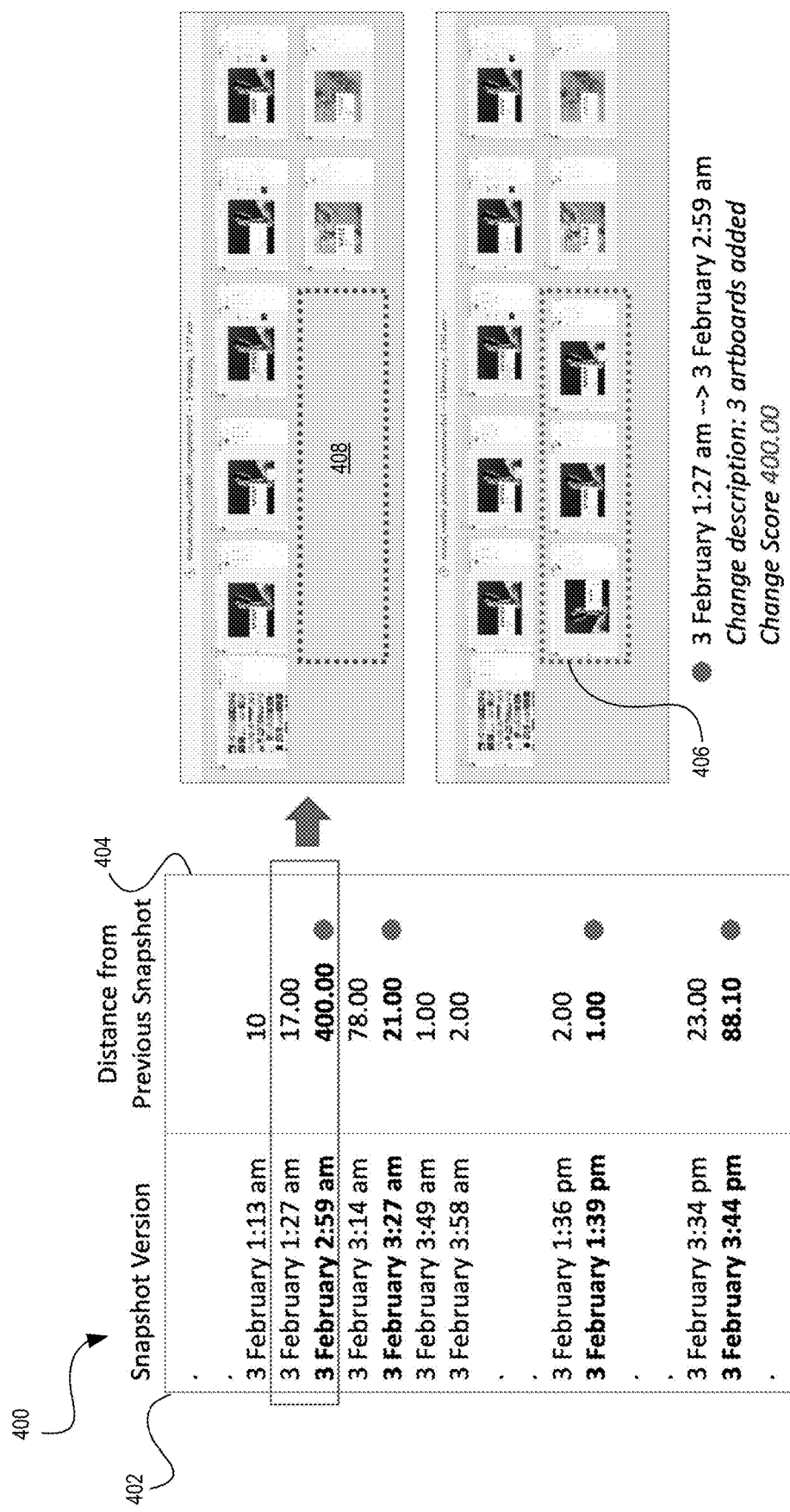
FIG. 4 illustrates an example of changes to a document discovered based on a distance metric, in accordance with one or more embodiments.

FIG. 4 illustrates an example of changes to a document discovered based on a distance metric, in accordance with one or more embodiments. FIG. 4 shows the scores for an example file and its versions. The table 400 on the left show the version 402 (named by date/timestamp) along with the calculated distance 404 from the previous version on the right. Note that these numbers are the distance or the difference in scores as against an absolute value. For the highlighted image, the design management system ranks the highlighted artboard changes as one of the most significant change indexed by "3 February, 2:59 am" with a distance of 400 points from the previous snapshot. Here, as seen, three new artboards 406 as highlighted in the zoom view were added in the "3 February, 2:59 am" version as compared to the "3 February, 1:27 am" version, and no existing artboards were modified. Therefore, based on equation 1, the distance score of 400 points would include the total number of elements of the three new artboards, which in this example equals 400. If other existing artboards were modified, then these changes would also factor into the distance score, as discussed with respect to equation 1, above.

Figure 5:
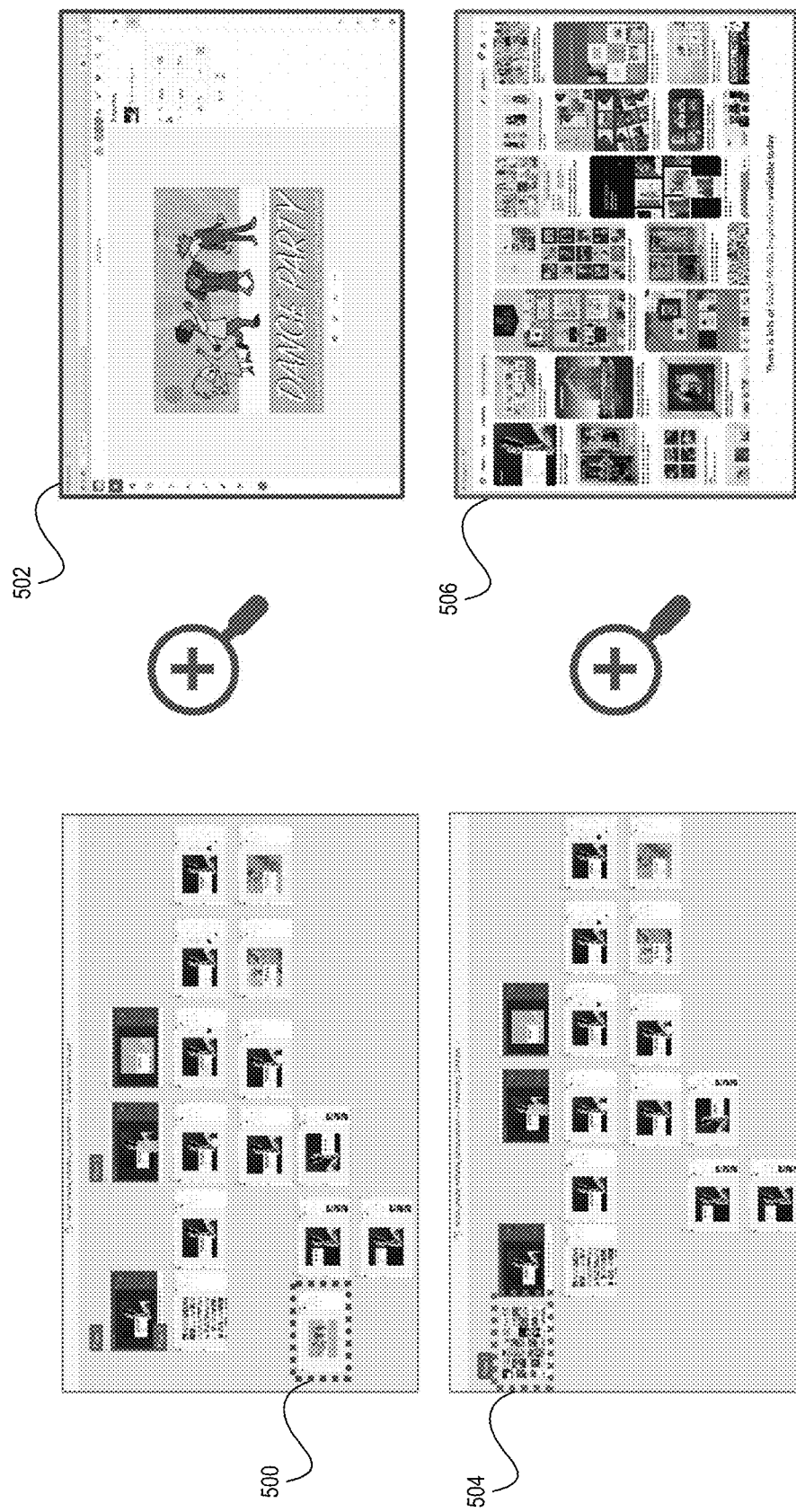
FIG. 5 illustrates an example of a high significance change in accordance with one or more embodiments.

FIG. 5 illustrates an example of a high significance change in accordance with one or more embodiments. As shown in FIG. 5, a particular inflection point can also be identified based on within-artboard changes. For example, in the previous version of the document, artboard 500 includes a dance party banner element 502. In the subsequent version, the artboard has been modified to artboard 504 which now depicts a mood board/idea board 506. This represents a high significance change to the document as the entire artboard has been changed. This results in a significant number of elements being added and removed from the artboard, resulting in a high distance score. In some embodiments, the number of attributes associated with the new elements may be summed to determine the distance score for these new elements. In some embodiments, the values of the attributes of the new elements may be used to determine the distance score. For example, larger new elements may contribute to a higher distance score than small elements due to having a larger size attribute.

Figure 6:
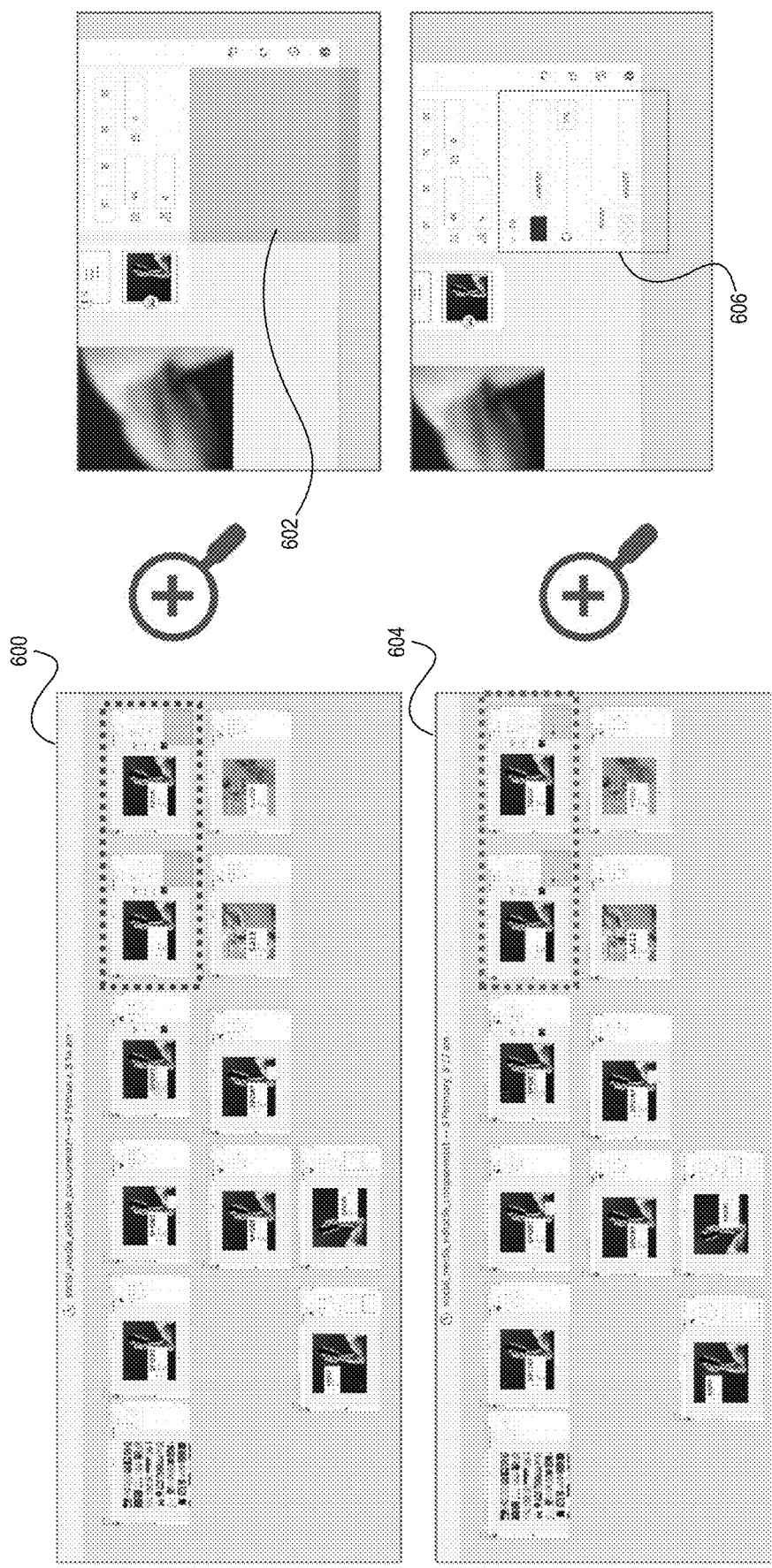
FIG. 6 illustrates an example of a medium significance change in accordance with one or more embodiments.

FIG. 6 illustrates an example of a medium significance change in accordance with one or more embodiments. In FIG. 6, a partial change is shown within a set of artboards 600 where a design block (i.e., a color and opacity element) is added. As shown in FIG. 6, the artboards previously did not include any elements in region 602. In the subsequent version, the updated artboards 604 now include a design block 606 with several user interface controls which allow the user to interact with the document. This represents a medium significance change to the document as an element is added to the document but most of the artboard remains unchanged. This results in a distance score corresponding to the number of elements added. In some embodiments, each element may contribute the same amount to the distance score (e.g., one new element equals one additional point added to the distance score). Alternatively, different types of elements may have different scores that they contribute to the distance score. For example, a user interactive element may be associated with a higher score than a passive element (e.g., an image, etc.). Additionally, or alternatively, the attributes of the elements added or removed may contribute to the distance score. For example, a larger element (as indicated by its "size" attribute) may contribute to a larger distance score than a smaller element.

Figure 7:
FIG. 7 illustrates an example of a low significance change in accordance with one or more embodiments.
Figure 7:
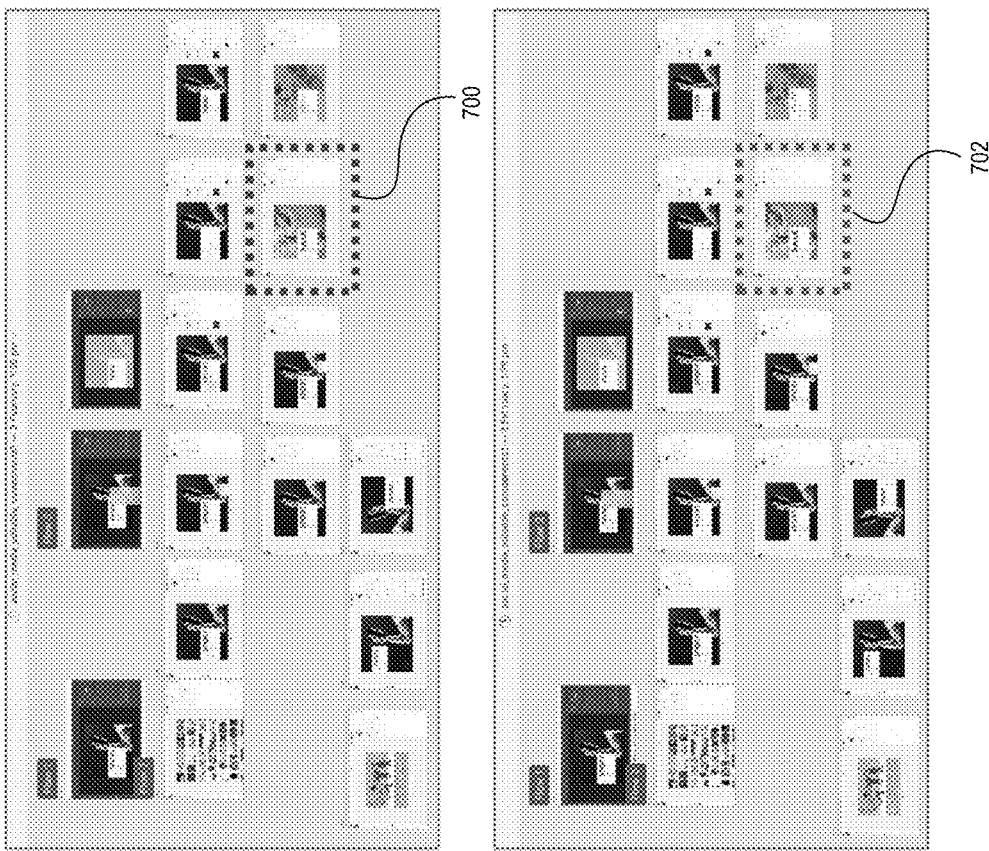

FIG. 7 illustrates an example of a low significance change in accordance with one or more embodiments. FIG. 7 shows a change detected as a change with low significance. In the example of FIG. 7, an element in the previous version artboard 700 has been resized in the subsequent version artboard 702. In this example, it is a small resize change as indicated at 704. In the context of the other changes and the variety of changes observed in this particular design this particular resize change was termed as the one with a low significance. This represents a low significance change as an element is slightly resized in one of the artboards.

Figure 8:
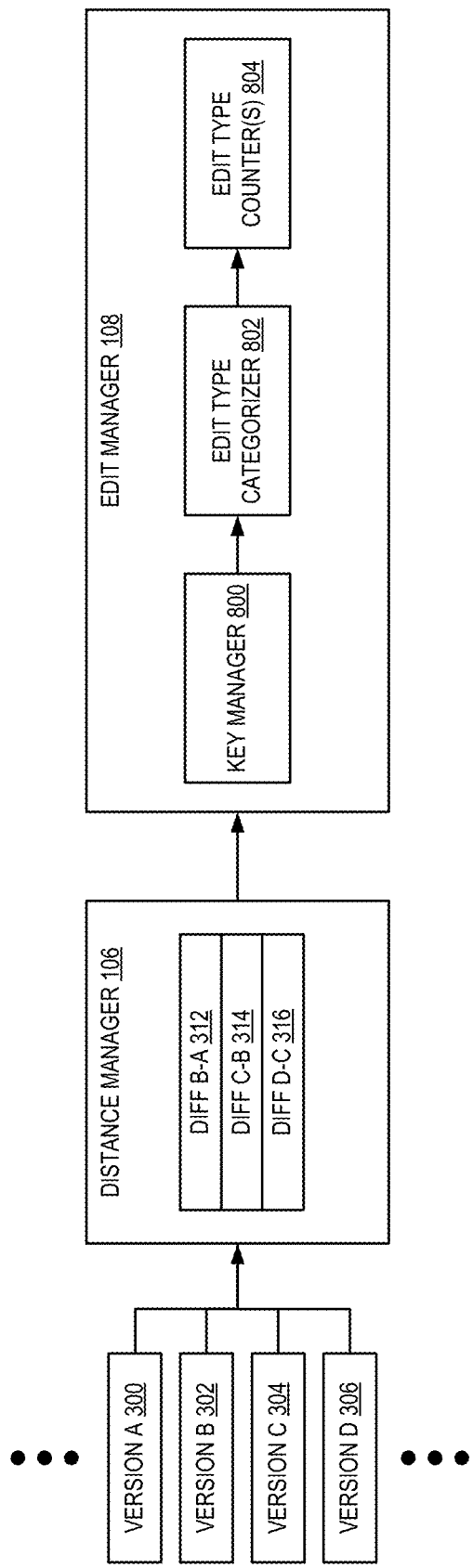
FIG. 8 illustrates a diagram of a process of identifying edit types associated with changes made between versions of a document, in accordance with one or more embodiments.

FIG. 8 illustrates a diagram of a process of identifying edit types associated with changes made between versions of a document, in accordance with one or more embodiments. As discussed, edit manager 108 can receive the diffs 310-316 generated by distance manager 106. The edit manager can include a key manager 800 which identifies a key associated with each changed attribute in each diff. As discussed, the keys may include "fill" or "text" key-value pairs, or other keys associated with the changed values represented in the diffs. Once the keys associated with the changes have been identified by the key manager 800, they can be categorized into edit types by edit type categorizer 802. The edit type categorizer may include a data structure that maps keys to specific edit types. For example, a fill key may map to a color edit type, a text key may map to a text edit type, etc. Once the changes have been mapped to their edit types, the edit type counter 804 can determine the number of edit types per diff. For example, the edit type counter may include a plurality of counters (e.g., one per edit type) which are incremented as edit types are identified.

Figure 9:
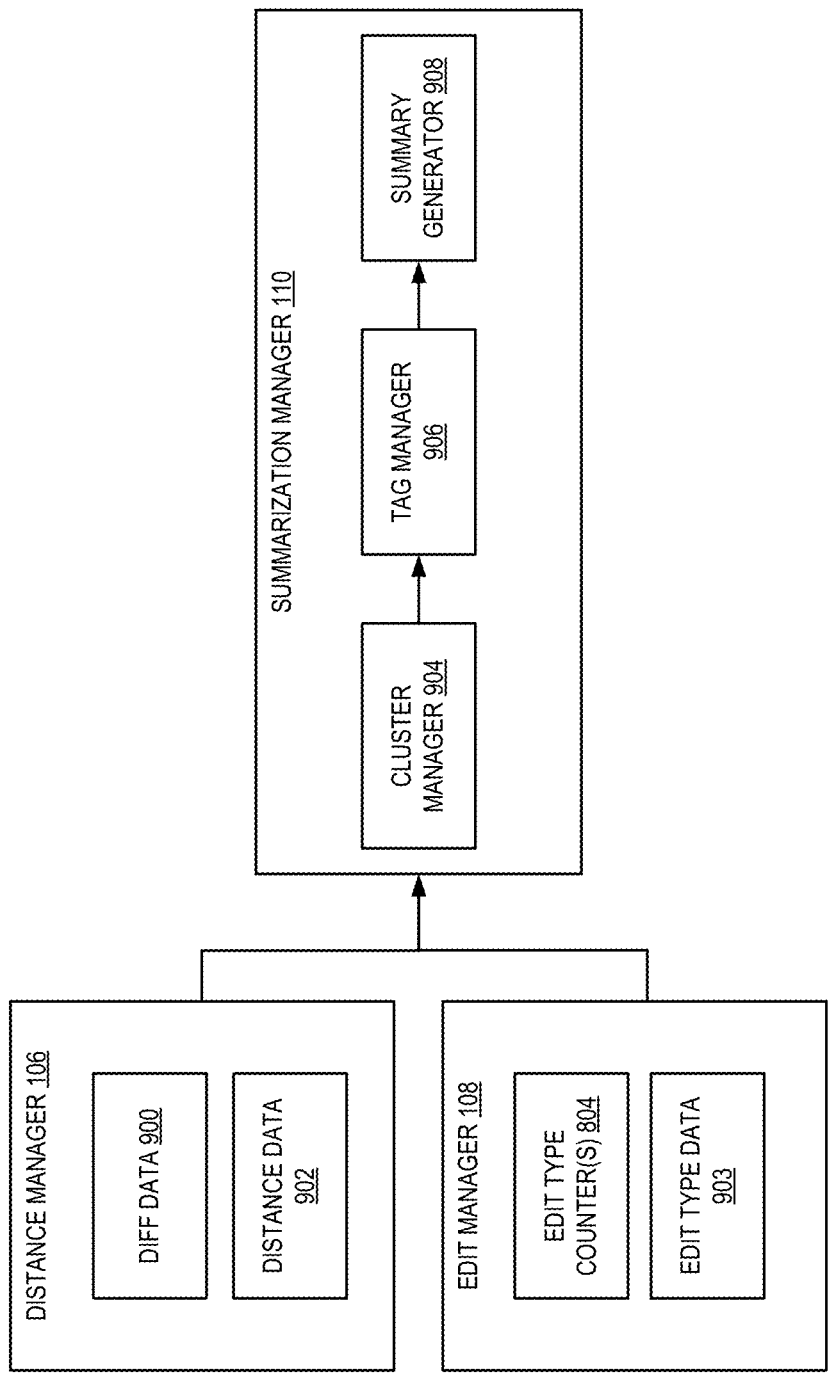
FIG. 9 illustrates a diagram of a process of generating a change summary of a document, in accordance with one or more embodiments.

FIG. 9 illustrates a diagram of a process of generating a change summary of a document, in accordance with one or more embodiments. As shown in FIG. 9, the summarization manager 119 can receive diff data 900 (e.g., diffs 312-316 described above) and distance data 902 (e.g., distance values 322-326 described above) from distance manager 106 and edit type counters 804 and edit type data 903 from edit manager 108. Using this data, the summarization manager 110 can generate an intelligent change summary of the document.

In some embodiments, the summarization manager 110 can include a cluster manager 904. The cluster manager 904 can identify clusters of distance values to identify high, medium, and low significance changes. Often, most versions will have no or few changes relative to a previous version. As such, the distance values associated with these versions is expected to be zero or close to zero. These versions can typically be ignored by the summarization manager. Instead, the cluster manager 904 can identify clusters of distance scores including the K largest distance scores, corresponding to high significance changes, and then a cluster of medium scores and a cluster of low scores. The size of these clusters may vary depending on the distribution of the distance scores for the document being analyzed.

Summarization manager 110 can further include tag manager 906. Tag manager 906 can receive the edit type data 903 which can include the edit type associated with the changes in the diff data as determined by the edit type categorizer, described above. The tag manager 906 can generate one or more tags to be associated with the distance scores. In some embodiments, each edit type contributing to a distance score of a given version may be tagged with that version. Alternatively, the edit type contributing the largest amount of distance to that version's score can be tagged. Additionally, the tag manager 906 can tag the versions that have been clustered with an identifier associated with their cluster. For example, versions in the high significance cluster can be tagged as having a high significance, and so on for each cluster. The tags and distance data can then be provided to summary generator 908, which generates a visual representation of the version history, including the distance scores and tags associated with each version.

Figure 10:
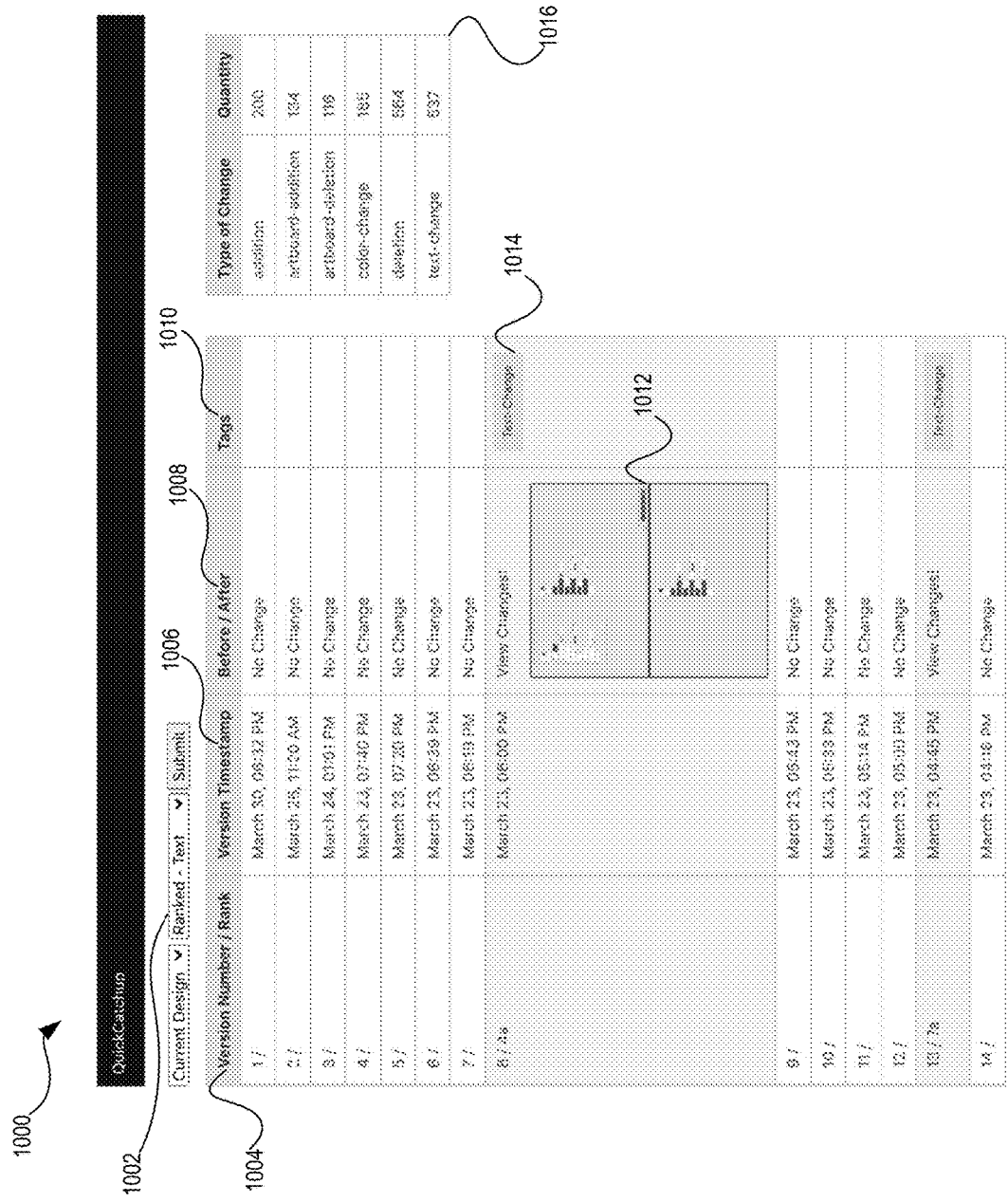
FIG. 10 illustrates an example user interface in accordance with one or more embodiments.

FIG. 10 illustrates an example user interface 1000 in accordance with one or more embodiments. As shown in FIG. 10, the user interface 1000 can enable the user to view the version history in temporal order, or to sort versions according to a particular edit type 1002. When sorted, the highest scoring versions along the selected dimension (e.g., text, color, etc.) can be shown first. This simplifies the review of the version history for the user, allowing the user to quickly identify relevant versions to examine.

In some embodiments, the user interface 1000 can include a table that includes a version number/rank 1004, a version timestamp 1006, a thumbnail of the changes 1008, and tags 1010. For example, version 8 is shown as having changes. This is illustrated in thumbnails 1012, which may be selected to show the user an easy to compare view of the version to the previous version. Additionally, the changes have been tagged with a text change tag 1014 indicating that the changes include, but are not limited to, text changes when compared to the previous version. In some embodiments, the user interface 1000 can also include a global summary 1016 which includes the edit type counter data in visual form, indicating the number of each type of change that appears in the version history.

Figure 11:
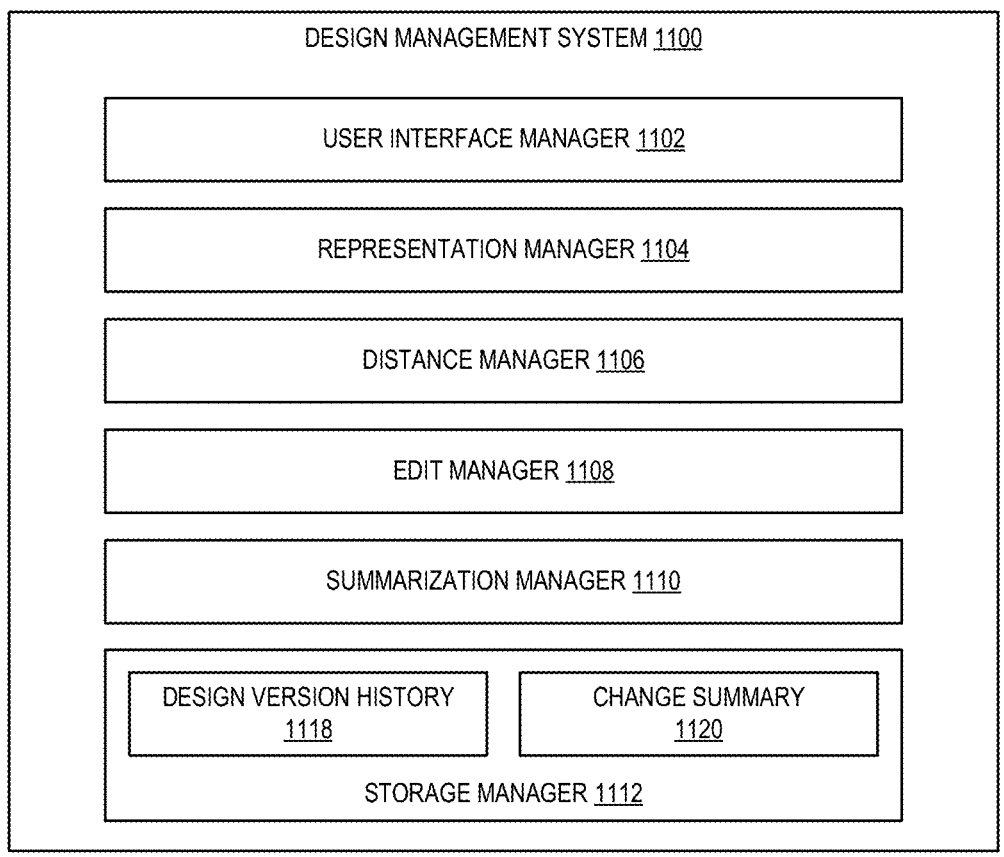
FIG. 11 illustrates a schematic diagram of a design management system in accordance with one or more embodiments.

FIG. 11 illustrates a schematic diagram of design management system (e.g., "design management system" described above) in accordance with one or more embodiments. As shown, the design management system 1100 may include, but is not limited to, user interface manager 1102, representation manager 1104, distance manager 1106, edit manager 1108, summarization manager 1110, and storage manager 1112. The storage manager 1112 includes design version history 1118 and change summary 1120.

As illustrated in FIG. 11, the design management system 1100 includes a user interface manager 1102. For example, the user interface manager 1102 allows users to select one or more documents or document version histories to be processed by the design management system. In some embodiments, the user interface manager 1102 enables a user to select one or more files which include design version history 1118 and are stored or accessible by storage manager 1112. In some embodiments, the user interface manager 1102 enables the user to select specific versions from the design version history to be compared (e.g., select a range based on timestamp data, version identifier, etc.). Additionally, the user interface manager 1102 allows users to request the design management system to generate a change summary 1120 for the selected design version history. Further, the user interface manager 1102 allows users to view the change summary, revert all or parts of the state of the document to an earlier state represented in a different version of the document, etc. In some embodiments, the change summary may be presented to the user via a user interface element managed by the user interface manager 1102, such as a sidebar, pop-up window, or other visual element. This may be provided through the graphical user interface of a digital design application, as a standalone design management application, or other application.

As further illustrated in FIG. 11, the design management system 1100 may further include a representation manager 1104. The representation manager 1104 may receive the design version history and generate a representation of each version associated with the version history. In some embodiments, as discussed above, this may include converting the version history from a first format to a second format. For example, artboards may be stored in AGC format files. The representation manager 1104 may convert the AGC files to JSON, or other format, files and represent the design version history in a tree structure. This allows for the attributes of like elements from different versions to be compared.

As further illustrated in FIG. 11, the design management system 1100 may further include a distance manager 1106. As discussed, the distance manager 1106 is responsible for comparing consecutive versions of the document being processed based on the document's version history. The distance manager 1106 can first compute a diff which represents all of the changes between a version and its preceding version. These may include additions, attribute value changes (e.g., size, position, fill, line width, text, etc.). These changes can then be processed by a distance function which assigns a point value to each change. For example, the distance function may assign a point to each added element and remove a point for each deleted element. In some embodiments, the points may be allocated for new elements based on the attributes of the new elements. For example, a large element may contribute a larger point total to the distance score than a smaller element, based on each elements' size attribute. For changed elements, the points may be based on the change. For example, is the size attribute of an element is changed by X pixels, then X points may be added to the distance. Similarly, if the fill color of an element is changed, then these hexadecimal values of these colors can be compared, and the difference used to assign a point value to the color change. In some embodiments, all changes may be equally weighted. Alternatively, some types of changes may be weighted more than others. For example, a color-forward document may weight color changes more than text changes, while a text-forward document may weight text changes more highly.

As further illustrated in FIG. 11, the design management system 1100 may further include an edit manager 1108. As discussed, the edit manager 1108 is responsible for identifying an edit type associated with the changes found between versions. In some embodiments, the edit manager 1108 can receive the diffs generated by the distance manager and identify the keys associated with the changes. The edit manager 1108 can include a data structure that maps keys to edit types. For example, changes to a fill key correspond to a color change, changes to a text key correspond to a text change, etc. The edit manager 1108 can additional maintain edit type counters which are incremented as edit types are identified for changes in the diffs.

As further illustrated in FIG. 11, the design management system 1100 may further include a summarization manager 1110. The summarization manager 1110, can receive the distance scores, edit type data and counter data from the distance manager and the edit manager and generate a visual representation of the changes embodied in the version history (e.g., change summary 1120). For example, the change summary 1120 can enable the user to navigate from version to version and be presented with a description and/or depiction of the changes associated with that version. As discussed, the summarization manager 1110 can tag versions based on the types of changes that were found. Additionally, the summarization manager 1110 can include thumbnails of the version and the prior version that indicate the changes that were found. In some embodiments, the change summary can be sorted based on the types of changes, the distance scores, the significance of the distance scores, etc. In some embodiments, the change summary 1120 can include a data structure indicating the quantity of each type of change made in the version history or in one or more selected versions.

As illustrated in FIG. 11, the design management system 1100 also includes the storage manager 1112. The storage manager 1112 maintains data for the design management system 1100. The storage manager 1112 can maintain data of any type, size, or kind as necessary to perform the functions of the design management system 1100. The storage manager 1112, as shown in FIG. 11, includes the design version history 1118. The design version history 1118 may include a plurality of timestamped versions of a particular document. In some embodiments, the design version history may be a data structure which points, or is otherwise linked, to the plurality of timestamped versions of the document which may be stored in a central storage location or across a plurality of electronic devices (e.g., desktops, laptops, servers, mobile devices, etc.). In some embodiments, each version of a document may be a separate file saved by the user or users or saved automatically by the application in which the document is being edited. In some embodiments, the design version history may be specific to the type of document and/or application and may be made available to the design management system 100 by the application.

As further illustrated in FIG. 11, the storage manager 1112 also includes change summary 1120. Change summary 1120 can include a visualization of the changes made across versions in the design version history being analyzed by the design management system. For example, change summary 1120 can be implemented as a user interface element of an application's graphical user interface. As discussed, the change summary 1120 can enable the user to navigate from version to version and be presented with a description and/or depiction of the changes associated with that version. As discussed, the summarization manager 1110 can tag versions based on the types of changes that were found. Additionally, the summarization manager 1110 can include thumbnails of the version and the prior version that indicate the changes that were found. In some embodiments, the change summary can be sorted based on the types of changes, the distance scores, the significance of the distance scores, etc. In some embodiments, the change summary 1120 can include a data structure indicating the quantity of each type of change made in the version history or in one or more selected versions.

Each of the components 1102-1112 of the design management system 1100 and their corresponding elements (as shown in FIG. 11) may be in communication with one another using any suitable communication technologies. It will be recognized that although components 1102-1112 and their corresponding elements are shown to be separate in FIG. 11, any of components 1102-1112 and their corresponding elements may be combined into fewer components, such as into a single facility or module, divided into more components, or configured into different components as may serve a particular embodiment.

The components 1102-1112 and their corresponding elements can comprise software, hardware, or both. For example, the components 1102-1112 and their corresponding elements can comprise one or more instructions stored on a computer-readable storage medium and executable by processors of one or more computing devices. When executed by the one or more processors, the computer-executable instructions of the design management system 1100 can cause a client device and/or a server device to perform the methods described herein. Alternatively, the components 1102-1112 and their corresponding elements can comprise hardware, such as a special purpose processing device to perform a certain function or group of functions. Additionally, the components 1102-1112 and their corresponding elements can comprise a combination of computer-executable instructions and hardware.

Furthermore, the components 1102-1112 of the design management system 1100 may, for example, be implemented as one or more stand-alone applications, as one or more modules of an application, as one or more plug-ins, as one or more library functions or functions that may be called by other applications, and/or as a cloud-computing model. Thus, the components 1102-1112 of the design management system 1100 may be implemented as a stand-alone application, such as a desktop or mobile application. Furthermore, the components 1102-1112 of the design management system 1100 may be implemented as one or more web-based applications hosted on a remote server. Alternatively, or additionally, the components of the design management system 1100 may be implemented in a suit of mobile device applications or "apps." To illustrate, the components of the design management system 1100 may be implemented as part of an application, or suite of applications, including but not limited to ADOBE CREATIVE CLOUD, ADOBE PHOTOSHOP, ADOBE ACROBAT, ADOBE ILLUSTRATOR, ADOBE LIGHTROOM and ADOBE INDESIGN. "ADOBE", "CREATIVE CLOUD," "PHOTOSHOP," "ACROBAT," "ILLUSTRATOR," "LIGHTROOM," and "INDESIGN" are either registered trademarks or trademarks of Adobe Inc. in the United States and/or other countries.

Figure 12:
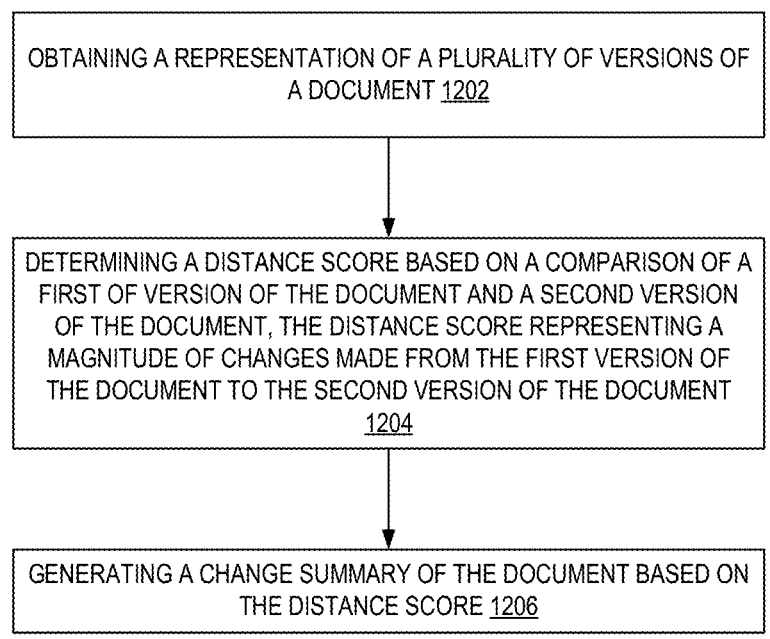
FIG. 12 illustrates a flowchart of a series of acts in a method of intelligent change summarization in accordance with one or more embodiments.

FIGS. 1-11, the corresponding text, and the examples, provide a number of different systems and devices that allows for intelligent change summarization. In addition to the foregoing, embodiments can also be described in terms of flowcharts comprising acts and steps in a method for accomplishing a particular result. For example, FIG. 12 illustrates a flowchart of an exemplary method in accordance with one or more embodiments. The method described in relation to FIG. 12 may be performed with fewer or more steps/acts or the steps/acts may be performed in differing orders. Additionally, the steps/acts described herein may be repeated or performed in parallel with one another or in parallel with different instances of the same or similar steps/acts.

FIG. 12 illustrates a flowchart 1200 of a series of acts in a method of intelligent change summarization in accordance with one or more embodiments. In one or more embodiments, the method 1200 is performed in a digital medium environment that includes the design management system 100. The method 1200 is intended to be illustrative of one or more methods in accordance with the present disclosure and is not intended to limit potential embodiments. Alternative embodiments can include additional, fewer, or different steps than those articulated in FIG. 12.

As illustrated in FIG. 12, the method 1200 includes an act 1202 of obtaining a representation of a plurality of versions of a document. In some embodiments, a version history of a document is obtained (e.g., from a user, from a file system, from an application associated with the document, etc.). As discussed, the version history may be a data structure which points to a plurality of versions of a particular document. In some embodiments, the representation of the plurality of versions of the document comprises a tree structure including a root representing the document, a first set of nodes from the root representing versions of the document, a second set of nodes from the first set of nodes representing artboards, and a third set of nodes from the second set of nodes representing elements of the artboards.

As illustrated in FIG. 12, the method 1200 also includes an act 1204 of determining a distance score based on a comparison of a first of version of the document and a second version of the document, the distance score representing a magnitude of changes made from the first version of the document to the second version of the document. In some embodiments, determining the distance score further includes determining one or more differences between one or more attribute values associated with one or more elements of the first version of the document to the one or more attribute values associated with the one or more elements in the second version of the document, and combining the one or more differences to determine the distance score.

In some embodiments, the method further includes determining a new artboard is added to the second version of the document, determining a number of elements associated with the new artboard, and combining the number of elements with the one or more differences to determine the distance score.

In some embodiments, combining the differences to determine the distance score includes calculating a sum of the one or more differences. In some embodiments, combining the differences to determine the distance score includes calculating a weighted sum of the one or more differences, wherein the one or more differences are weighted based on an edit type associated with the difference. In some embodiments, the edit type includes at least one of a text change, a color change, or an object change.

As illustrated in FIG. 12, the method 1200 also includes an act 1206 of generating a change summary of the document based on the distance score. In some embodiments, generating the change summary includes tagging one or more versions of the document in the change summary based on the edit type associated with changes made between consecutive versions of the document represented by the distance score.

In some embodiments, each version of the document includes a plurality of attributes defining a state of a plurality of corresponding elements of the document, wherein the plurality of corresponding elements includes one or more of shapes, text, or groups. In some embodiments, the plurality of attributes include one or more of size, position, stroke, color, or text.

In some embodiments, identifying an inflection point in a version history of the document based on the plurality of distance scores, further includes determining a subset of the plurality of versions having a highest distance score. In some embodiments, a size of the subset of the plurality of versions is determined based on a distribution of the plurality of distance scores. In some embodiments, the method further includes categorizing the subset of the plurality of versions into high significance, medium significance, and low significance.

In some embodiments, the method further includes determining an edit type associated with changes made between consecutive versions of the document, determining a plurality of distance scores associated with each edit type, and identifying an inflection point for each edit type.

In some embodiments, the method further includes iterating over the representation of the plurality of versions to determine a plurality of distance scores, each distance score associated with changes between consecutive versions of the document, identifying at least one subset of the plurality of distance scores based on their values, determining at least one subset of the plurality of versions corresponding to the at least one subset of distance scores, and categorizing the at least one subset of the plurality of versions into high significance, medium significance, or low significance.

Figure 13:
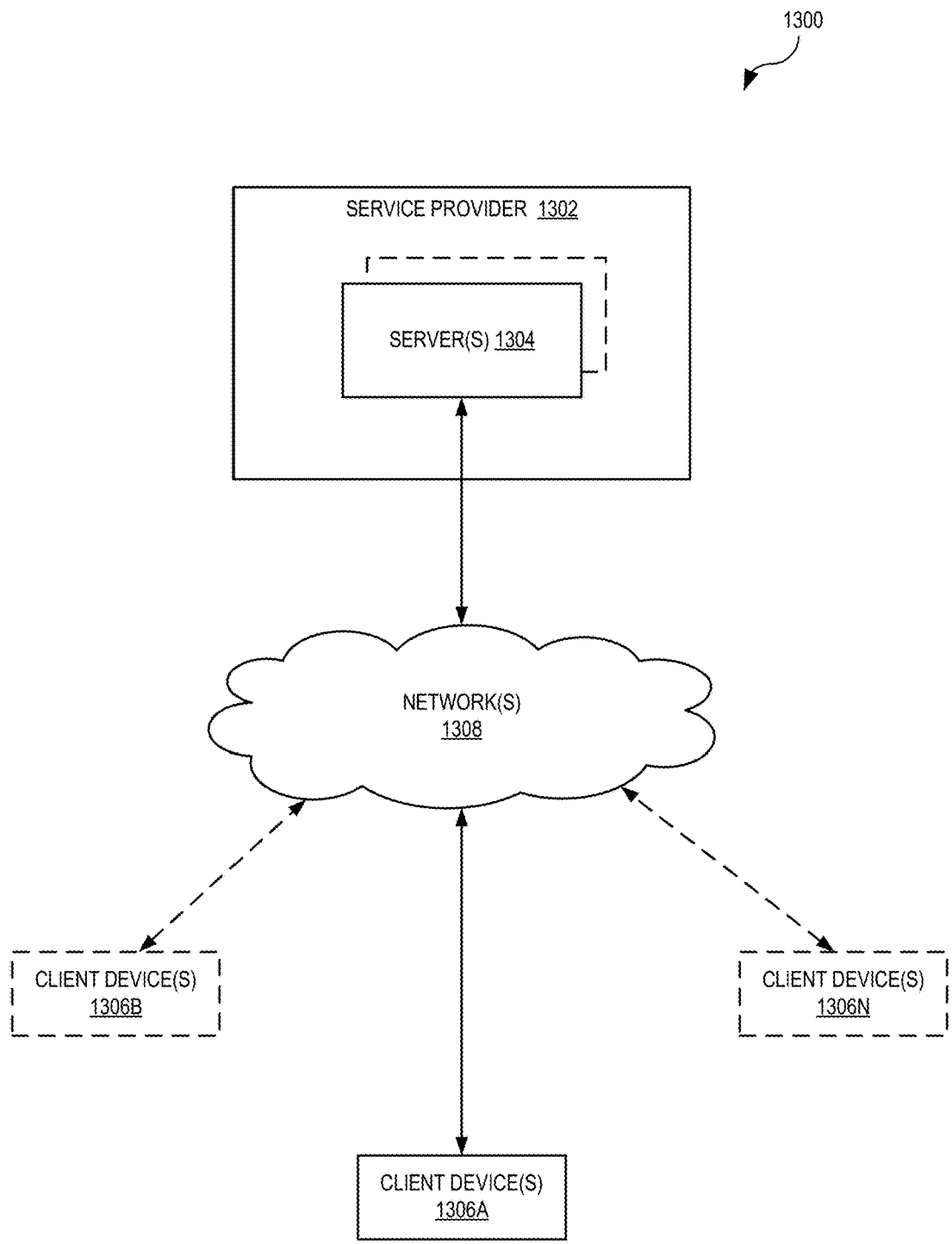
FIG. 13 illustrates a schematic diagram of an exemplary environment in which the image processing system can operate in accordance with one or more embodiments.

FIG. 13 illustrates a schematic diagram of an exemplary environment 1300 in which the design management system 1100 can operate in accordance with one or more embodiments. In one or more embodiments, the environment 1300 includes a service provider 1302 which may include one or more servers 1304 connected to a plurality of client devices 1306A-1306N via one or more networks 1308. The client devices 1306A-1306N, the one or more networks 1308, the service provider 1302, and the one or more servers 1304 may communicate with each other or other components using any communication platforms and technologies suitable for transporting data and/or communication signals, including any known communication technologies, devices, media, and protocols supportive of remote data communications, examples of which will be described in more detail below with respect to FIG. 14.

Although FIG. 13 illustrates a particular arrangement of the client devices 1306A-1306N, the one or more networks 1308, the service provider 1302, and the one or more servers 1304, various additional arrangements are possible. For example, the client devices 1306A-1306N may directly communicate with the one or more servers 1304, bypassing the network 1308. Or alternatively, the client devices 1306A-1306N may directly communicate with each other. The service provider 1302 may be a public cloud service provider which owns and operates their own infrastructure in one or more data centers and provides this infrastructure to customers and end users on demand to host applications on the one or more servers 1304. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1304. In some embodiments, the service provider may be a private cloud provider which maintains cloud infrastructure for a single organization. The one or more servers 1304 may similarly include one or more hardware servers, each with its own computing resources, which are divided among applications hosted by the one or more servers for use by members of the organization or their customers.

Similarly, although the environment 1300 of FIG. 13 is depicted as having various components, the environment 1300 may have additional or alternative components. For example, the environment 1300 can be implemented on a single computing device with the design management system 1100. In particular, the design management system 1100 may be implemented in whole or in part on the client device 1302A.

As illustrated in FIG. 13, the environment 1300 may include client devices 1306A-1306N. The client devices 1306A-1306N may comprise any computing device. For example, client devices 1306A-1306N may comprise one or more personal computers, laptop computers, mobile devices, mobile phones, tablets, special purpose computers, TVs, or other computing devices, including computing devices described below with regard to FIG. 14. Although three client devices are shown in FIG. 13, it will be appreciated that client devices 1306A-1306N may comprise any number of client devices (greater or smaller than shown).

Moreover, as illustrated in FIG. 13, the client devices 1306A-1306N and the one or more servers 1304 may communicate via one or more networks 1308. The one or more networks 1308 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1308 may be any suitable network over which the client devices 1306A-1306N may access service provider 1302 and server 1304, or vice versa. The one or more networks 1308 will be discussed in more detail below with regard to FIG. 14.

In addition, the environment 1300 may also include one or more servers 1304. The one or more servers 1304 may generate, store, receive, and transmit any type of data, including design version history 1118, change summary 1120, or other information. For example, a server 1304 may receive data from a client device, such as the client device 1306A, and send the data to another client device, such as the client device 1302B and/or 1302N. The server 1304 can also transmit electronic messages between one or more users of the environment 1300. In one example embodiment, the server 1304 is a data server. The server 1304 can also comprise a communication server or a web-hosting server. Additional details regarding the server 1304 will be discussed below with respect to FIG. 14.

As mentioned, in one or more embodiments, the one or more servers 1304 can include or implement at least a portion of the design management system 1100. In particular, the design management system 1100 can comprise an application running on the one or more servers 1304 or a portion of the design management system 1100 can be downloaded from the one or more servers 1304. For example, the design management system 1100 can include a web hosting application that allows the client devices 1306A-1306N to interact with content hosted at the one or more servers 1304. To illustrate, in one or more embodiments of the environment 1300, one or more client devices 1306A-1306N can access a webpage supported by the one or more servers 1304. In particular, the client device 1306A can run a web application (e.g., a web browser) to allow a user to access, view, and/or interact with a webpage or website hosted at the one or more servers 1304.

Upon the client device 1306A accessing a webpage or other web application hosted at the one or more servers 1304, in one or more embodiments, the one or more servers 1304 can provide access to a design version history (e.g., design version history 1118) stored at the one or more servers 1304. Moreover, the client device 1306A can receive a request (i.e., via user input) for a change summary of a document associated with the design version history and provide the request to the one or more servers 1304. Upon receiving the request, the one or more servers 1304 can automatically perform the methods and processes described above to generate a change summary of the design version history. The one or more servers 1304 can provide the change summary to the client device 1306A for display to/interaction with the user.

As just described, the design management system 1100 may be implemented in whole, or in part, by the individual elements 1302-1308 of the environment 1300. It will be appreciated that although certain components of the design management system 1100 are described in the previous examples with regard to particular elements of the environment 1300, various alternative implementations are possible. For instance, in one or more embodiments, the design management system 1100 is implemented on any of the client devices 1306A-N. Similarly, in one or more embodiments, the design management system 1100 may be implemented on the one or more servers 1304. Moreover, different components and functions of the design management system 1100 may be implemented separately among client devices 1306A-1306N, the one or more servers 1304, and the network 1308.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
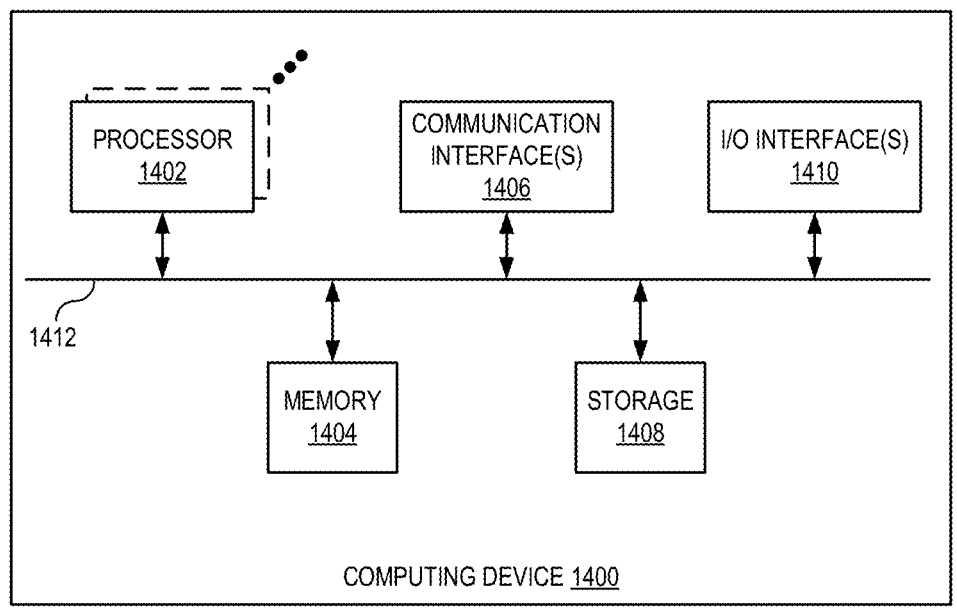
FIG. 14 illustrates a block diagram of an exemplary computing device in accordance with one or more embodiments.

FIG. 14 illustrates, in block diagram form, an exemplary computing device 1400 that may be configured to perform one or more of the processes described above. One will appreciate that one or more computing devices such as the computing device 1400 may implement the image processing system. As shown by FIG. 14, the computing device can comprise a processor 1402, memory 1404, one or more communication interfaces 1406, a storage device 1408, and one or more I/O devices/interfaces 1410. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1408 and decode and execute them. In various embodiments, the processor(s) 1402 may include one or more central processing units (CPUs), graphics processing units (GPUs), field programmable gate arrays (FPGAs), systems on chip (SoC), or other processor(s) or combinations of processors.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1404 may be internal or distributed memory.

The computing device 1400 can further include one or more communication interfaces 1406. A communication interface 1406 can include hardware, software, or both. The communication interface 1406 can provide one or more interfaces for communication (such as, for example, packet-based communication) between the computing device and one or more other computing devices 1400 or one or more networks. As an example and not by way of limitation, communication interface 1406 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

The computing device 1400 includes a storage device 1408 includes storage for storing data or instructions. As an example, and not by way of limitation, storage device 1408 can comprise a non-transitory storage medium described above. The storage device 1408 may include a hard disk drive (HDD), flash memory, a Universal Serial Bus (USB) drive or a combination these or other storage devices. The computing device 1400 also includes one or more input or output ("I/O") devices/interfaces 1410, which are provided to allow a user to provide input to (such as user strokes), receive output from, and otherwise transfer data to and from the computing device 1400. These I/O devices/interfaces 1410 may include a mouse, keypad or a keyboard, a touch screen, camera, optical scanner, network interface, modem, other known I/O devices or a combination of such I/O devices/interfaces 1410. The touch screen may be activated with a stylus or a finger.

The I/O devices/interfaces 1410 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1410 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
    obtaining a representation of a plurality of versions of a document, wherein the representation of the plurality of versions of the document comprises a tree structure including a root representing the document, a first set of nodes from the root representing versions of the document, a second set of nodes from the first set of nodes representing artboards, and a third set of nodes from the second set of nodes representing elements of the artboards;
    converting the representation of the plurality of versions into a JavaScript Object Notation (JSON) file, the JSON file including a plurality of key-value pairs representing one or more attribute values associated with one or more elements of each version of the plurality of versions;
    identifying a key of the plurality of key-value pairs associated with a changed attribute value, the changed attribute value being at least one of a size attribute, a position attribute, a stroke attribute, or a color attribute associated with a changed shape between consecutive versions of the document;
    mapping the key to an edit type;
    determining a distance score using a distance function based on a first version of the document comprising one or more attribute values including values of at least one of a first size attribute, a first position attribute, a first stroke attribute, or a first color attribute associated with a first shape, the first shape being an element of one or more elements of the first version of the document and a second version of the document comprising one or more attribute values including values of at least one of a second size attribute, a second position attribute, a second stroke attribute, or a second color attribute associated with a second shape, the second shape being an element of one or more elements of the second version of the document, the distance score representing a difference between the one or more attribute values associated with the first shape of the first version of the document and the one or more attribute values associated with the second shape of the second version of the document; and
    generating a change summary of the document based on the distance score and the edit type.

2. The computer-implemented method of claim 1, wherein determining the distance score, further comprises:
    determining one or more differences between the one or more attribute values associated with the one or more elements of the first version of the document to the one or more attribute values associated with the one or more elements in the second version of the document; and
    combining the one or more differences to determine the distance score.

3. The computer-implemented method of claim 2, wherein combining the one or more differences to determine the distance score further comprises:
    calculating a sum of the one or more differences.

4. The computer-implemented method of claim 2, wherein combining the one or more differences to determine the distance score further comprises:
    calculating a weighted sum of the one or more differences, wherein the one or more differences are weighted based on the edit type associated with the difference.

5. The computer-implemented method of claim 4, wherein the edit type includes at least one of a text change, a color change, or an object change.

6. The computer-implemented method of claim 1, wherein generating the change summary of the document based on the distance score, further comprises:
    tagging one or more versions of the document in the change summary based on the edit type associated with changes made between consecutive versions of the document represented by the distance score.

7. The computer-implemented method of claim 2, further comprising:
    determining a new artboard is added to the second version of the document;
    determining a number of elements associated with the new artboard; and
    combining the number of elements with the one or more differences to determine the distance score.

8. The computer-implemented method of claim 1, further comprising:
    iterating over the representation of the plurality of versions to determine a plurality of distance scores, each distance score associated with changes between consecutive versions of the document;

identifying at least one subset of the plurality of distance scores based on their values;

determining at least one subset of the plurality of versions corresponding to the at least one subset of distance scores; and categorizing the at least one subset of the plurality of versions into high significance, medium significance, or low significance.

9. A non-transitory computer readable storage medium including instructions stored thereon which, when executed by a processor, cause the processor to:

obtain a representation of a plurality of versions of a document, wherein the representation of the plurality of versions of the document comprises a tree structure including a root representing the document, a first set of nodes from the root representing versions of the document, a second set of nodes from the first set of nodes representing artboards, and a third set of nodes from the second set of nodes representing elements of the artboards;

convert the representation of the plurality of versions into a JavaScript Object Notation (JSON) file, the JSON file including a plurality of key-value pairs representing one or more attribute values associated with one or more elements of each version of the plurality of versions;

identify a key of the plurality of key-value pairs associated with a changed attribute value, the changed attribute value being at least one of a size attribute, a position attribute, a stroke attribute, or a color attribute associated with a changed shape between consecutive versions of the document;

map the key to an edit type;

determine a distance score using a distance function based on a first version of the document comprising one or more attribute values including values of at least one of a first size attribute, a first position attribute, a first stroke attribute, or a first color attribute associated with a first shape, the first shape being an element of one or more elements of the first version of the document and a second version of the document comprising one or more attribute values including values of at least one of a second size attribute, a second position attribute, a second stroke attribute, or a second color attribute associated with a second shape, the second shape being an element of one or more elements of the second version of the document, the distance score representing a difference between the [n] one or more attribute values associated with the first shape of the first version of the document and the one or more attribute values associated with the second shape of the second version of the document; and generate a change summary of the document based on the distance score and the edit type.

10. The non-transitory computer readable storage medium of claim 9, wherein to determine the distance score further cause the processor to:

determine one or more differences between one or more attribute values associated with one or more elements of the first version of the document to the one or more attribute values associated with the one or more elements in the second version of the document; and combine the one or more differences to determine the distance score.

11. The non-transitory computer readable storage medium of claim 10, wherein to combine the one or more differences to determine the distance score, the instructions, when executed, further cause the processor to:

calculate a sum of the one or more differences.

12. The non-transitory computer readable storage medium of claim 10, wherein to combine the one or more differences to determine the distance score, the instructions, when executed, further cause the processor to:

calculate a weighted sum of the one or more differences, wherein the one or more differences are weighted based on the edit type associated with the difference.

13. The non-transitory computer readable storage medium of claim 12, wherein the edit type includes at least one of a text change, a color change, or an object change.

14. The non-transitory computer readable storage medium of claim 12, wherein to generate the change summary of the document based on the distance score, the instructions, when executed, further cause the processor to:

tag one or more versions of the document in the change summary based on the edit type associated with changes made between consecutive versions of the document represented by the distance score.

15. The non-transitory computer readable storage medium of claim 10, wherein the instructions, when executed, further cause the processor to:

determine a new artboard is added to the second version of the document;

determine a number of elements associated with the new artboard; and combine the number of elements with the one or more differences to determine the distance score.

16. The non-transitory computer readable storage medium of claim 9, wherein the instructions, when executed, further cause the processor to:

iterate over the representation of the plurality of versions to determine a plurality of distance scores, each distance score associated with changes between consecutive versions of the document;

identify at least one subset of the plurality of distance scores based on their values;

determine at least one subset of the plurality of versions corresponding to the at least one subset of distance scores; and categorize the at least one subset of the plurality of versions into high significance, medium significance, or low significance.

17. A system, comprising:

a processor; and a memory including instructions which, when executed by the processor, cause the system to:

obtain a representation of a plurality of versions of a document, wherein the representation of the plurality of versions of the document comprises a tree structure including a root representing the document, a first set of nodes from the root representing versions of the document, a second set of nodes from the first set of nodes representing artboards, and a third set of nodes from the second set of nodes representing elements of the artboards;

convert the representation of the plurality of versions into a JavaScript Object Notation (JSON) file, the JSON file including a plurality of key-value pairs representing one or more attribute values associated with one or more elements of each version of the plurality of versions;

identify a key of the plurality of key-value pairs associated with a changed attribute value, the changed attribute value being at least one of a size attribute, a position attribute, a stroke attribute, or a color attribute associated with a changed shape between consecutive versions of the document;

map the key to an edit type;

determine a distance score using a distance function based on a first version of the document comprising one or more attribute values including values of at least one of a first size attribute, a first position attribute, a first stroke attribute, or a first color attribute associated with a first shape, the first shape being an element of one or more elements of the first version of the document and a second version of the document comprising one or more attribute values including values of at least one of a second size attribute, a second position attribute, a second stroke, or a second color associated with a second shape, the second shape being an element of one or more elements—of the second version of the document, the distance score representing a difference between the one or more attribute values associated with the first shape of the first version of the document and the one or more attribute values associated with the second shape of the second version of the document; and generate a change summary of the document based on the distance score and the edit type.

18. The system of claim 17, wherein the instructions, when executed, further cause the system to:

iterate over the representation of the plurality of versions to determine a plurality of distance scores, each distance score associated with changes between consecutive versions of the document;

identify at least one subset of the plurality of distance scores based on their values;

determine at least one subset of the plurality of versions corresponding to the at least one subset of distance scores; and categorize the at least one subset of the plurality of versions into high significance, medium significance, or low significance.

19. The computer-implemented method of claim 1, further comprising:

determining a third shape is added to the second version of the document, the third shape including a value of a third size attribute;

combining the third size attribute associated with the third shape with the one or more attribute values associated with the second shape; and increasing the distance score using the distance function based on the value of the third size attribute of the third shape, the distance score representing a difference between the one or more attribute values associated with the first shape of the first version of the document, and the combined attribute values of the second shape and third shape of the second version of the document.

* * * * *